2 Sheets--Sheet 1.

W. H. HARFIELD.

Windlasses.

No. 6,105

Reissued Oct. 27, 1874.

*Witnesses:*

William E. Bullock

Chas. M. Higgins.

*Inventor:*

William Horatio Harfield.

per Burke & Fraser.

Attys.

2 Sheets--Sheet 2.

W. H. HARFIELD.

Windlasses.

No. 6,105.

Reissued Oct. 27, 1874.

*Witnesses:*

William E. Bullock
Chas. M. Higgins.

*Inventor:*

William Horatio Harfield.
per Burke & Fraser,
Attys.

UNITED STATES PATENT OFFICE.

WILLIAM H. HARFIELD, OF LONDON, ENGLAND.

IMPROVEMENT IN WINDLASSES.

Specification forming part of Letters Patent No. 93,878, dated August 17, 1869; antedated February 18, 1867; reissue No. 6,105, dated October 27, 1874; application filed October 9, 1874.

*To all whom it may concern:*

Be it known that I, WILLIAM HORATIO HARFIELD, of the city of London, England, have invented certain new and useful Improvements in Windlasses, of which the following is a specification:

The object of my invention is to dispense with the rigid connector hitherto used in connecting the revolving chain-wheel with the main barrel of the windlass, substituting a frictional connector, which also acts as a brake to check the cable in veering, and enables one chain-wheel to be used independently of the other, and also to effect a more secure connection and arrangement of the anchor-chain with the windlass-barrel.

Figure 1:
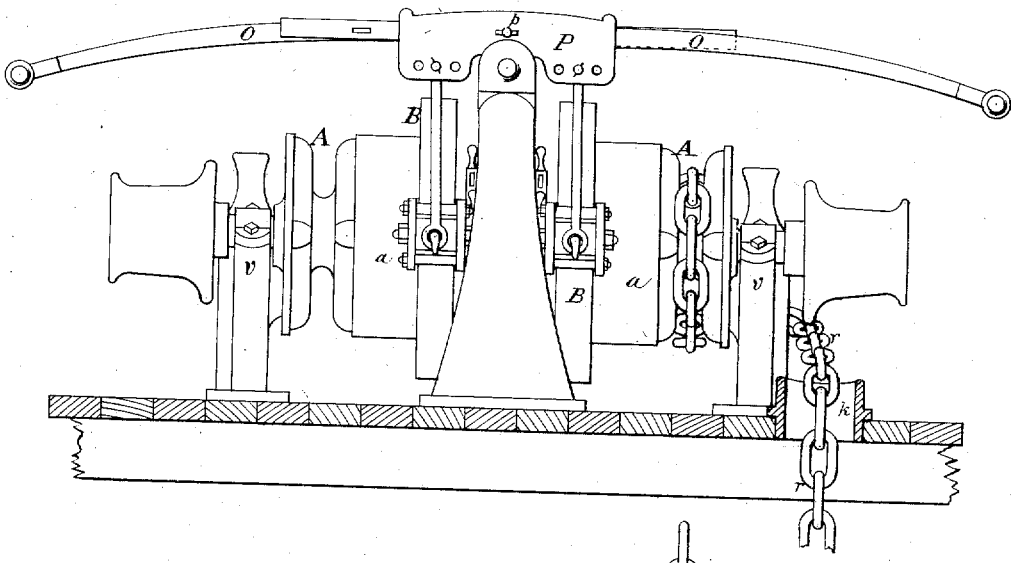
Figure 2:
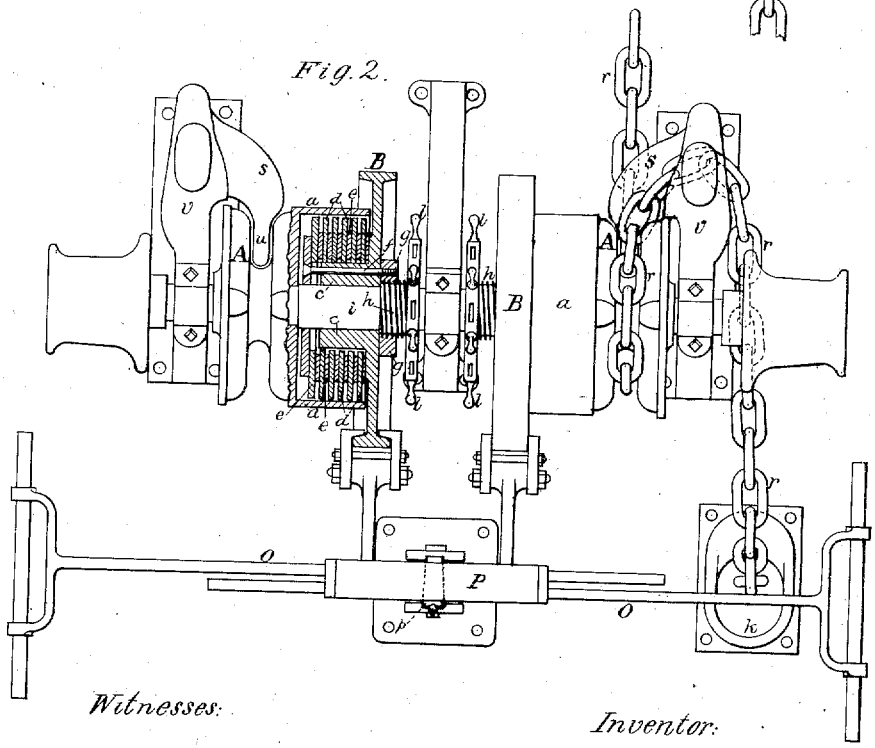
Figure 3:
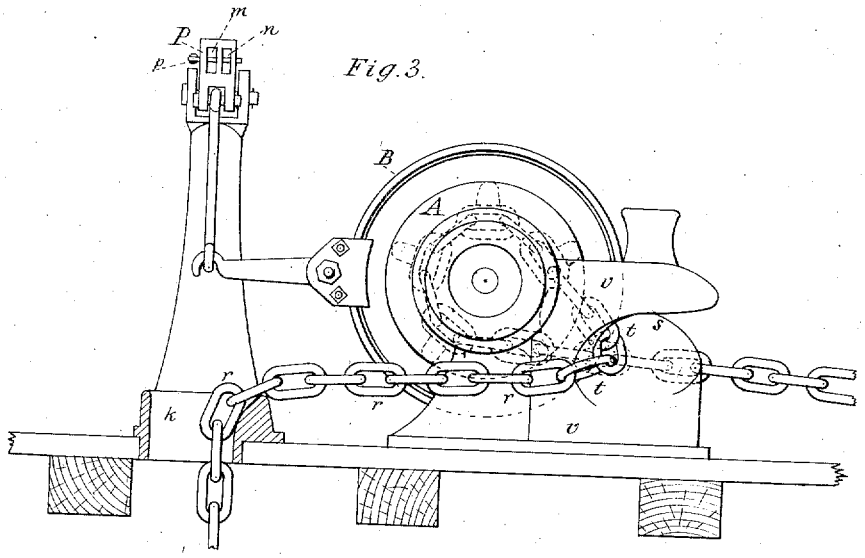
Figure 4:
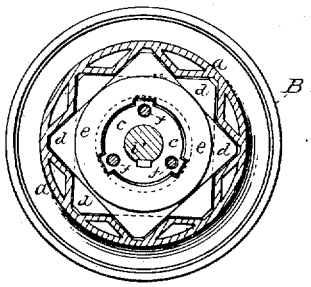
Figure 5:
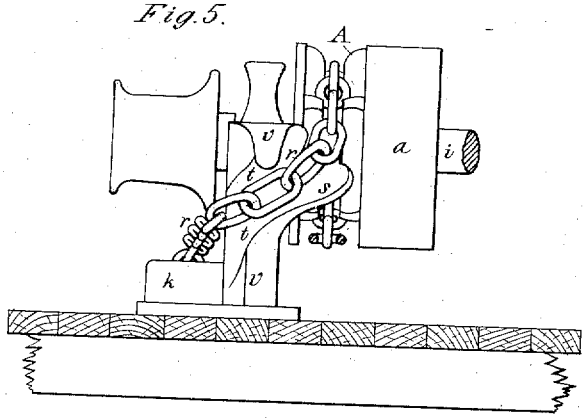

In the annexed drawings, Figure 1 is a rear elevation of my improved windlass. Fig. 2 is a plan view, a portion being shown in section. Fig. 3 is an end elevation. Fig. 4 is a section through the drum *a*, showing portions of the frictional connector in elevation. Fig. 5 is a front elevation of one end of the windlass, showing the arrangement of the anchor-chain with relation to the windlass-barrel.

The manner in which I apply the frictional connector is shown most clearly in Fig. 2, and is as follows: The chain-wheel A is loose upon the main axle or spindle *i* of the windlass, and is constructed with a drum, *a*, which overlaps the boss *c* of purchase-wheel B, Fig. 2, which purchase-wheel is keyed or fixed to the axle. In the annular space between boss *c* of purchase-wheel B and overhanging drum *a* of the chain-wheel is fitted a double series of disks, *d* and *e*, (shown in section in Fig. 2,) one series, *d*, being fitted to slide on lateral grooves or projections (shown in Fig. 4) in interior of drum *a*, therefore having the same circular motion; the other series, *e*, in like manner sliding on lateral feathers *b b* on exterior of boss *c*, and revolving with purchase-wheel B. The disks *e* on the purchase-wheel alternate with those on the drum *a*; but as they are free to move in a lateral direction, the chain-wheel A, with its series of disks *d*, can be revolved freely and quite independent of purchase-wheel B with its series of disks *e*.

When it is required either to check the veering out of the chain, or to connect the chain-wheel to the windlass-barrel for heaving in, the whole series of disks is compressed together, by which the friction due to the power applied is multiplied by the number of surfaces in the double series of disks. This compression of the disks is effected in the following manner: The outside disk *e* from the purchase-wheel has three bolts, *f f*, fastened to it, which pass through holes in the purchase-wheel, and are secured to a nut, *g*, on the other side, which nut is acted upon by a screw, *h*, mounted loosely upon the spindle *i*, and revolved by a hand-wheel, *l*. This screw *h* bears against the purchase-wheel, and when it is revolved in one direction it draws the nut *g* from the purchase-wheel and compresses the whole of the disks together, the reverse motion releasing them.

I prefer to make the disks *e* on purchase-wheel of galvanized iron, and disks *d* in drum of teak; but other materials may be used.

The second part of my invention relates to the connection and arrangement of the anchor-chain in relation to the windlass-barrel; and it consists in so arranging the chain that, as the same rises from the chain-locker in rear of the windlass it is led to the front of the windlass-barrel, and there wound backwardly over the forward and upper side of the chain-wheel, and around its periphery, toward the forward and lower side, where it leaves the wheel and extends forward to connect with the anchor.

In windlasses previous to my invention, the chain, after rising from the locker in rear of the windlass, passed directly over the top of the chain-wheel and extended to the front. By this arrangement but two or three links of the chain are engaged with the chain-wheel at the same time, which renders the connection weak and the chain liable to become disengaged by a tendency sometimes to jump from the periphery of the wheel. Moreover, the strain is thus borne by a small portion only of the wheel's periphery, and hence breakage is more liable to occur, while the direction, also, of the strain is such as to tend to lift up the rear part of the windlass and disengage it from its attachment to the deck. These defects are obviated by my invention, as will be now explained.

As shown in Figs. 2, 3, and 5, the aperture

*k*, leading to the chain-locker, is placed, as usual, abaft the windlass-barrel; but, instead of being in a line with the chain-wheel A, it is placed one side thereof, and outside the windlass-bearing *v*. The bearing *v* is wider, or extends farther forward beyond the windlass-barrel, than is usual, and upon its front face, and at about the vertical center thereof, is formed a deep curved recess, *t*, having an upward and lateral inclination toward the periphery of the chain-wheel A. A wing or flange, *s*, projects laterally from the inward side of the bearing, forming a continuation of the recess *t*, and having the same inclination, being terminated by a narrow tongue, *u*, which projects into the central groove of the chain-wheel, as shown more clearly in Fig. 2. The chain, as it leaves the chain-locker, extends to the front of the windlass-barrel, enters the recess *t*, and is wound backwardly over the top and around the periphery of the chain-wheel, leaving the periphery on the lower and forward side, as shown best in Figs. 3 and 5, and then extends forward to connect with the anchor. The recess *t*, with the flange *s* and tongue *u*, forms a chain-guide to guide the chain to and from the wheel, and prevent the links becoming entangled or displaced, and thus insures a steady and harmonious motion of the chain and wheel.

It will be seen, on reference to Figs. 2, 3, and 5, that the chain becomes engaged with the chain-wheel at a point a little above its forward center, extends around the wheel, and leaves the periphery at a point a little below its forward center, and thus the chain is engaged with almost the entire periphery of the wheel, thereby making the connection very secure, and entirely preventing any liability to slip or become disengaged, as in the old method. It will also be seen, on reference to Fig. 3, that the chain leaves the barrel on a slight downward and forward incline, and hence the strain on the windlass is downward and forward. The downward strain, of course, tends to force the windlass against the deck, and hence tends to hold it more firmly in place; while the forward strain, being in almost a horizontal direction, is resisted by all the bolts by which the windlass is secured to the deck acting in concert, and hence it will be perceived that this arrangement of the chain is not only more secure with relation to the connection with the chain-wheel, but that also the strain upon the windlass is caused to bear in a direction the most safe and desirable, while in the old method the strain tending to lift up the rear part of the windlass is resisted effectually by the rear bolts only.

A further part of my invention relates to an easy method of varying the power and speed of windlasses. I do this by casting two holes, *m* and *n*, for lever O, side by side, through the whole length of cross-head P. The levers, being disconnected, can very readily be moved in or out, thus varying the power by increasing or diminishing their effective length. A cotter, *p*, passes through the cross-head, securing the levers when put in the position required.

I do not claim the arrangement of a double series of disks for the purpose of producing friction; but

What I claim as my invention, and desire to secure by Letters Patent, is—

1. The combination and arrangement of the compressor, purchase-wheel B, nut *g*, and screw *h*, to form a windlass and brake, and by means of which one chain-wheel can be employed independently of the other, substantially as described.

2. In a windlass, the arrangement of the anchor-chain to engage with the chain-wheel at its upper and forward side, extend around the same, and leave the periphery on the lower and forward side, substantially as herein shown and described.

3. The windlass-bearing *v*, provided with the recess *t* and flange *s*, in combination with the chain *r* and wheel A, substantially as and for the purpose set forth.

In witness whereof I have hereunto signed my name in the presence of two subscribing witnesses.

W. H. HARFIELD.

Witnesses:

H. G. BISHOP,
5 *Nicholas Lane, Lombard Street, London, E. C.*

L. H. ERTTMANN,
70 *and* 71 *Bishopsgate Street, London, E. C.*